(12) United States Patent
Kolosowsky

(10) Patent No.: US 6,909,544 B2
(45) Date of Patent: Jun. 21, 2005

(54) METHOD FOR ELIMINATING STRONG AMBIENT LIGHT IN AIRCRAFT COCKPITS

(75) Inventor: Aleksandra Kolosowsky, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 248 days.

(21) Appl. No.: 10/123,811

(22) Filed: Apr. 16, 2002

(65) Prior Publication Data

US 2003/0193622 A1 Oct. 16, 2003

(51) Int. Cl.[7] .......................... G02B 5/30; G02B 27/28; G02F 1/1335
(52) U.S. Cl. ...................... 359/501; 359/601; 359/900; 349/16
(58) Field of Search ...................... 349/16, 11; 359/485, 359/501, 601, 630, 632, 900

(56) References Cited

U.S. PATENT DOCUMENTS

| | | | |
|---|---|---|---|
| 2,102,632 A | * | 12/1937 | Land |
| 2,280,358 A | * | 4/1942 | Tietig |
| 2,562,895 A | * | 8/1951 | Dreyer |
| 4,123,141 A | * | 10/1978 | Schuler |
| 4,577,928 A | | 3/1986 | Brown .................... 350/276 R |
| 4,974,946 A | | 12/1990 | Solomon ..................... 350/399 |
| 5,075,789 A | | 12/1991 | Jones et al. .................... 357/40 |
| 5,115,305 A | | 5/1992 | Baur et al. ..................... 358/60 |
| 5,115,341 A | * | 5/1992 | Bentley |
| 5,128,659 A | * | 7/1992 | Roberts et al. |
| 5,267,029 A | | 11/1993 | Kurematsu et al. ........... 358/60 |
| 5,335,022 A | | 8/1994 | Braun et al. ................. 348/744 |
| 5,467,943 A | * | 11/1995 | Umeda |
| 5,566,025 A | * | 10/1996 | Knoll et al. |
| 5,579,139 A | * | 11/1996 | Abileah et al. |
| 5,657,161 A | * | 8/1997 | Melograne |
| 6,262,843 B1 | * | 7/2001 | Marx |
| 6,552,850 B1 | * | 4/2003 | Dudasik |
| 6,563,649 B2 | * | 5/2003 | Furuya |

FOREIGN PATENT DOCUMENTS

| JP | 02300786 | * | 12/1990 |
| JP | 10051764 | * | 2/1998 |

* cited by examiner

*Primary Examiner*—Ricky D. Shafer

(57) ABSTRACT

Light is polarized in perpendicular directions between a source of light and a users viewing of information on a display device. A first sheet of polarized material is placed at the source of the light, such as a window in a cockpit. A second sheet of polarized material is attached or integral to a display device. The pass axis of the second sheet is oriented substantially perpendicular to pass axis of the first sheet.

18 Claims, 1 Drawing Sheet

METHOD FOR ELIMINATING STRONG AMBIENT LIGHT IN AIRCRAFT COCKPITS

FIELD OF THE INVENTION

The present invention relates to display devices, and in particular to the use of two polarizers to ensure visibility of the display in strong ambient light.

BACKGROUND OF THE INVENTION

Display devices, such as liquid crystal displays (LCDs) and cathode ray tubes (CRTs) are used to display data to users. Bright environments, such as cockpits of aircraft often contain such display devices. In some environments, the visibility of information is critical. In aircraft, good visibility of the information on display devices can be critical to safe operation of the aircraft.

Prior solutions for minimizing the effect of cockpit ambient light include application of various films or coatings only to display surfaces. Coatings such as AR, AG, and linear or circular polarizers work under low or moderate ambient light conditions, but fail at higher levels of illuminance, such as 10 K foot candles.

There is a need for enhanced visibility of information on display devices in bright environments.

SUMMARY OF THE INVENTION

Light is polarized in perpendicular directions between a source of light and a user's viewing of information on a display device. In one embodiment, a first polarized material is placed at the source of the light, such as a side window in a cockpit. A second polarized material is positioned proximate a display device, or attached with adhesive. The projected polarization pass axis of the first polarized material is oriented substantially perpendicular to polarization pass axis of the second polarized material.

In one embodiment, the first polarized material comprises a first sheet of polarized material comprises adhesive on one side, and is placed directly on a side window comprising the source of bright light. In a further embodiment, the first sheet comprises a shade that can be moved to cover the window in a repeatable manner, such in a pull down shade configuration, or an electro optical device such as a switchable polarizing window.

In further embodiments, the display device comprises a LCD display that is manufactured with an integrated polarizer. The first sheet of polarizing material is then attached with a polarization pass axis orientation substantially perpendicular to that of the integrated polarizer. Such an orientation is easily obtained by simply moving the first sheet of polarizing material to a position that substantially minimizes the effect of light on the display device.

When a CRT display is utilized, the second polarized material comprises a second sheet of polarizing material comprises a separate transparent material which is properly positionable proximate the CRT to minimize reflection from bright ambient light.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
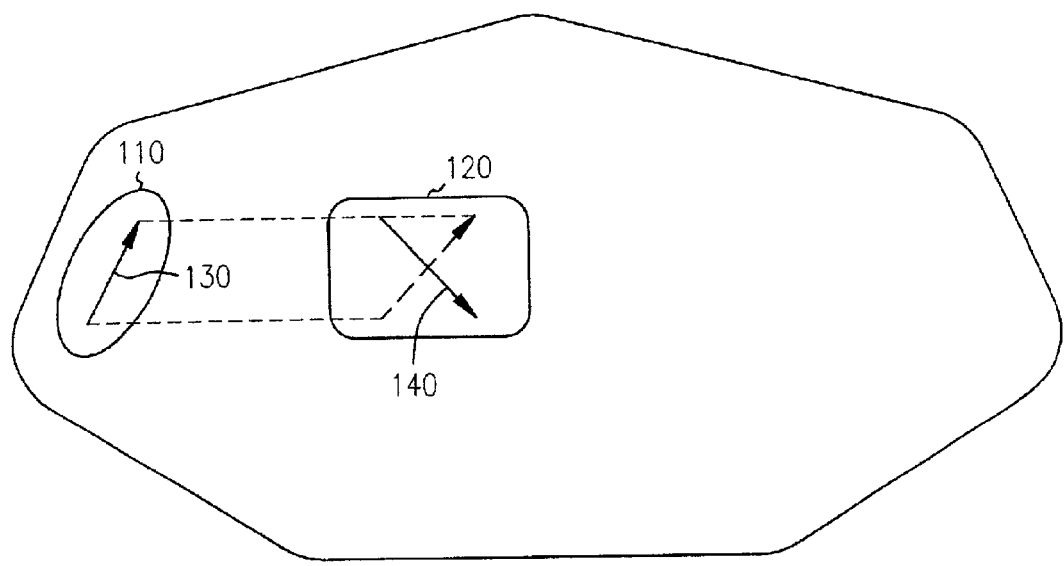
FIG. 1 is a block representation of a pair of polarizing sheets in a cockpit having a display device.

FIG. 1 is a block diagram of a cockpit having a light source 110, such as a window, and a display device 120, which receives ambient light from light source 110. In prior systems, the ambient light would overwhelm the visibility of information viewable on the display device. In the present invention, a first sheet of polarizing material 130, represented by an arrow is attached to the window 110. The arrow on material 130 also approximately represents the pass axis orientation of the polarizing material. A second sheet of polarizing material 140, represented by an arrow is attached to the display screen 120. The arrow on material 140 represents the pass axis orientation of the polarizing material, and is projected substantially perpendicular or orthogonal to projected light from the pass axis of material 130. The actual angle of the pass axis of each polarizing material is dependent on the geometry of the cockpit.

Each side window proximate an environment containing a display is provided with a sheet of polarizing material having a pass axis orientation projected approximately perpendicular to that of the polarization on the display. The polarizer in one embodiment is a high-transmittance, high-efficiency polarizer and is available from several manufacturers, such as Polaroid and Nitto. The polarizer also contains a pressure sensitive adhesive to enable easy attachment to the surface. In further embodiments, an electro optical device provides the proper polarization, such as a switchable polarizing window.

The display device comprises an active display device that is self-contained and directly provides an image to the user, such as a LCD display or CRT display. LCD displays are manufactured with an integrated polarizer. The first sheet of polarizing material is then attached with a polarization pass axis orientation substantially perpendicular to that of the integrated polarizer. Such an orientation is easily obtained by simply moving or rotating the first sheet of polarizing material to a position that substantially minimizes the effect of ambient light on the display device.

When a CRT display is utilized, the second sheet of polarizing material comprises a separate transparent material which is properly positionable proximate the CRT such as attached to the cover glass to substantially minimize or reduce ambient reflection from bright light such that information on the CRT is easily viewable.

Figure 2:
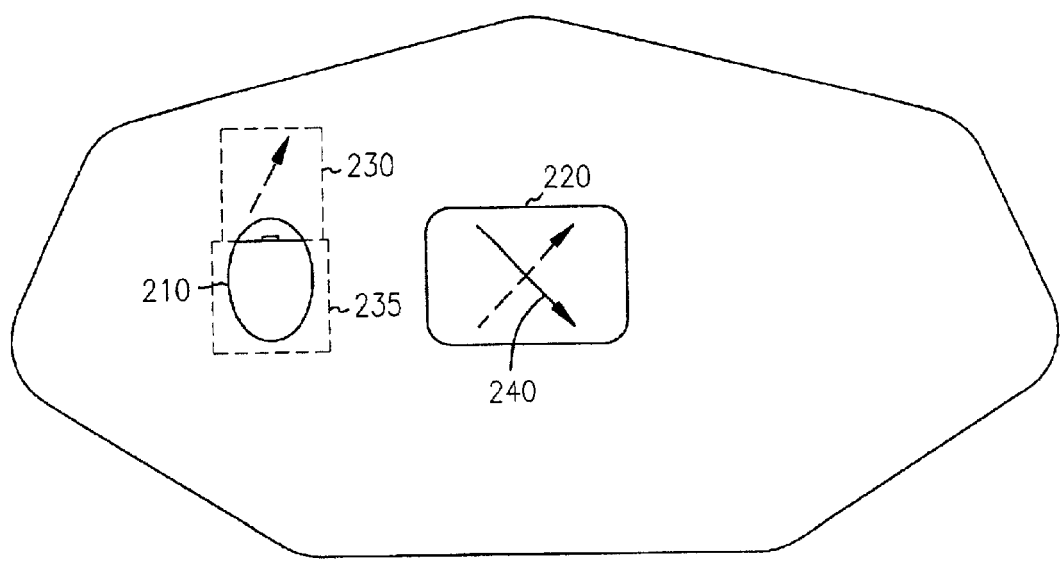
FIG. 2 is a block representation of an alternative embodiment of a cockpit having a display device.

In FIG. 2, a cockpit is shown, but is representative of many other environments having high ambient light conditions such as that caused by a bright source of light, such as a window 210. The cockpit also contains display devices 220. In this embodiment, the first sheet of polarized material is in the form of a shade 230, which is similar to opaque shades on commercial aircraft that passengers use to totally block sunlight. Shade 230, however, is polarized material, having a polarization oriented as previously described. The material, such as a sheet, is affixed or adhered to Plexiglas or other transparent material to provide rigidity. The sheet is pulled down in tracks 235 proximate to the window to cover the window when ambient light in the cockpit is interfering with information on the display. The display also comprises a sheet of polarizing material 240 or other polarization mechanism, which operates in conjunction with shade 230 to block a significant portion of the light from interfering with information on the display.

CONCLUSION

A display viewing room such as cockpit has a side window or other structure through which strong ambient light enters the room. A first polarizing sheet is positioned proximate the window. The room also contains a display device for conveying information to a user. A second polarizing is positioned proximate to the display. The polarizing sheets have pass axis orientations substantially perpendicular to each other to significantly reduce or eliminate ambient reflection on the display.

The polarizing sheets are alternatively in the form of retractable shades. The shades are moveable from a first position covering the display or window to a second position not covering the display or window. The shades may be positioned near or proximate the window or display to reduce ambient reflection. In some embodiments, the shades are positioned very close to the window or display, and in other embodiments close enough to the display or window to ensure that a significant amount of the light passes through both polarizing sheets prior to reaching a user.

A method of reducing the effect of ambient light on a display is performed by placing a first polarizing material proximate a display having a first pass axis orientation. A second polarizing material is placed proximate a source of ambient light. The second material has a second pass axis substantially perpendicular to the first pass axis. One of the polarizing materials is rotated to minimize the affect of the ambient light on visibility of information on the display. Where there are multiple ambient light sources and multiple displays, care should be taken to consistently align the pass axis of each sheet.

What is claimed is:

1. A cockpit of an aircraft comprising:
   a window positioned to allow external ambient light to enter the cockpit;
   a first polarizing material at least partially covering the window;
   a display positioned within the cockpit; and
   a second polarizing material coupled to the display, wherein the polarizing materials have pass axis orientations substantially perpendicular to each other to prevent the ambient light from substantially interfering with direct visibility of information being displayed on the display.

2. The cockpit of claim 1 wherein the polarizing materials comprise sheets having a pressure sensitive adhesive.

3. The cockpit of claim 1 wherein the display comprises a LCD display, and wherein the second polarizing material is integrated into the display.

4. The cockpit of claim 1 wherein the display comprises a CRT, and the second polarizing material is positioned proximate a surface of the display.

5. The cockpit of claim 1 wherein the polarizing materials comprise high-transmittance, high efficiency polarizers.

6. A display viewing room comprising:
   a window positioned to allow external ambient light to enter the room;
   a first polarizing material at least partially covering the window;
   a display positioned within the room; and
   a second polarizing material coupled to the display, wherein the polarizing materials have pass axis orientations substantially perpendicular to each other to prevent the ambient light from substantially interfering with direct visibility of information being displayed on the display, wherein the first polarizing material comprises a retractable shade proximate the window.

7. The room of claim 6 wherein the retractable shade comprises a polarizing material coupled to a retractable transparent shade or comprises an electro-optical switchable polarizer.

8. A display, the display comprising:
   a display surface for conveying information directly to a user; and
   a polarization mechanism coupled to the display that has a pass axis orientation substantially perpendicular to an incident polarized light shining on the display wherein the display is located in a cockpit, and the incident polarized light is provided by a polarizer proximate a side window in the cockpit.

9. The display of claim 8 wherein the polarizing mechanism comprises a pressure sensitive adhesive sheet.

10. The display of claim 8 wherein the polarizing sheet comprises a high-transmittance, high efficiency polarizer.

11. The display of claim 8 wherein the display comprises a CRT, and the polarizing mechanism is adhered directly on a surface of the display.

12. A method of reducing the effect of ambient light on an active display in an aircraft cockpit, the method comprising:
   placing a first polarizing sheet proximate a display having a first pass axis orientation; and
   placing a second polarizing sheet proximate a source of ambient light wherein the source is a side window of the aircraft cockpit, the second sheet having a second pass axis substantially perpendicular to the first pass axis to prevent the ambient light from substantially interfering with direct visibility of information being displayed on the display.

13. The method of claim 12 wherein the polarizing sheets comprise a pressure sensitive adhesive.

14. The method of claim 12 where in the display comprises a CRT, and the second polarizing sheet is adhered directly on surface of the display.

15. The method of claim 12 wherein the second polarizing sheet is placed proximate the source of the ambient light by sliding it into place from a retracted position.

16. The method of claim 12 wherein the polarizing sheets comprise high-transmittance, high efficiency polarizers.

17. A method of reducing the effect of ambient light on a display in a cockpit of an aircraft, the method comprising:

placing a first polarizer proximate a display having a first pass axis orientation;

placing a second polarizer proximate a source of ambient light, wherein the source is a side window of the aircraft cockpit, the second polarizer having a second pass axis substantially perpendicular to the first pass axis; and wherein one of the polarizers is rotated to minimize the affect of the ambient light on direct visibility of information on the display.

18. A cockpit comprising:

a side window positioned to allow external ambient light to enter a room;

a polarizer positioned proximate the window, wherein the polarizer has a pass axis oriented substantially perpendicular to a pass axis of polarized display within the cockpit to prevent the ambient light from substantially interfering with direct visibility of information being displayed on the display.

* * * * *